(12) United States Patent
Goode

(10) Patent No.: US 9,834,129 B2
(45) Date of Patent: Dec. 5, 2017

(54) BUILDABLE SEAL FOR SLIDE-OUT ROOMS

(71) Applicant: Tobin Michael Goode, Granger, IN (US)

(72) Inventor: Tobin Michael Goode, Granger, IN (US)

(73) Assignee: Titan Distribution, LLC, Elkhart, IN (US)

( * ) Notice: Subject to any disclaimer, the term of this patent is extended or adjusted under 35 U.S.C. 154(b) by 0 days.

(21) Appl. No.: 15/005,561

(22) Filed: Jan. 25, 2016

(65) Prior Publication Data

US 2016/0214524 A1 Jul. 28, 2016

Related U.S. Application Data

(60) Provisional application No. 62/106,965, filed on Jan. 23, 2015.

(51) Int. Cl.
*B60P 3/36* (2006.01)
*B60P 3/34* (2006.01)

(52) U.S. Cl.
CPC .. *B60P 3/36* (2013.01); *B60P 3/34* (2013.01)

(58) Field of Classification Search
CPC ..................................... B60P 3/36; B60P 3/34

USPC ........................................................ 296/165
See application file for complete search history.

(56) References Cited

U.S. PATENT DOCUMENTS

| | | | |
|---|---|---|---|
| 6,048,016 A | 4/2000 | Futrell | |
| 6,966,590 B1 | 11/2005 | Ksiezopolki | |
| 7,735,891 B2 | 6/2010 | Goode | |
| 8,910,422 B2 * | 12/2014 | Siegel | B60P 3/32 277/649 |
| 9,033,390 B1 * | 5/2015 | Ksiezopolski | B60R 13/06 296/26.13 |
| D741,231 S * | 10/2015 | Schoonover | D12/106 |
| 2002/0078634 A1 | 6/2002 | McManus | |

* cited by examiner

*Primary Examiner* — Joseph D Pape
(74) *Attorney, Agent, or Firm* — Varnum, Riddering, Schmidt & Howlett LLP

(57) ABSTRACT

A buildable seal assembly (100) is used with a jacket (102) which is connected to a sidewall (14) and slide out room (12) of a conventional RV or similar mobile equipment or mobile living quarters (10). A right angled seal element (132) is coupled to the jacket (102) in a snap in configuration. The right angled seal element (132) is further coupled to a bulb (152) and a wiper component (146). The bulb (152) and wiper component (146) assist in providing a seal between the mobile living quarters (10) and the slide out room (12) when the room (12) is in a retracted, closed position or an extended, open position.

17 Claims, 8 Drawing Sheets

BUILDABLE SEAL FOR SLIDE-OUT ROOMS

CROSS-REFERENCE TO RELATED APPLICATIONS

This Application claims benefit of U.S. Provisional Patent Application Ser. No. 62/106,965 filed Jan. 23, 2015.

STATEMENT REGARDING FEDERALLY SPONSORED RESEARCH OR DEVELOPMENT

Not applicable.

REFERENCE TO A MICROFISHE APPENDIX

Not applicable.

BACKGROUND OF THE INVENTION

Field of the Invention

The invention relates to devices for facilitating the sealing of perimeters of slide-out rooms and other structures associated with recreational vehicles (RVs) and other mobile products.

Background Art

The general concept of employing means for facilitating sealing of joints in the construction of structures such as towable trailers, motorized recreational vehicles, buildings (particularly metal buildings) and similar structures is known in the prior art. For many of these types of structures, a substantially rigid frame is provided, which consists of structural support members, such as studs. The structural support members of the frame support and mount walls on the exterior of the frame. The walls are formed as prefabricated panels placed on the exterior of the frame formed by the structural support members. Corners are formed at the junctures of adjacent panels lying in different, but typically perpendicular planes. Also, typically, one of the adjacent panels is intended to overlap the adjacent support members by the thickness of the adjacent panel. In this manner, the adjacent panels lie in perpendicular planes which meet at a butt joint. Concepts associated with technologies associated with corner rail extrusions are disclosed in Goode, U.S. Pat. No. 7,735,891 issued Jun. 15, 2010.

Resilient seals are often placed along the abutting edges of parts, and one such application is found in the field of mobile living quarters having slide-out rooms. A seal is commonly placed along the interface between the slide-out room and the opening in the sidewall of the mobile living quarters to prevent water, debris, and excessive air drafts from entering the interior of the mobile living quarters from the outside. This seal often includes two sub-parts, a bulb seal and a wiper seal, each extending along a side of the opening. The bulb seal is usually placed on either the exterior edge of the sidewall or the interior edge of a flange portion of the slide-out room wall to form a resilient seal between the sidewall and the flange portion of the slide-out room when the room is closed. A separate wiper seal is usually placed along the edge of the sidewall and flexibly protrudes against the adjacent sidewall of the slide-out room so as to be in constant contact with the sidewall at all positions of the room between its open and closed positions. A typical example of such an arrangement can be seen in U.S. Patent Application Publication No. US 2002/0078634 A1, published Jun. 27, 2002. A problem with this type of seal arrangement is that the bulb seal and wiper seal must be mounted separately.

Another known seal arrangement used for the slide-out room includes a pair of bulb seals on opposite sides of a mounting portion, and a wiper seal protruding from an adjacent side of the mounting portion between the bulb seals, as disclosed in U.S. Pat. No. 6,048,016. The mounting portion is mounted to the edge of the sidewall of the mobile living quarters between the two opposite sides with a clip such that the wiper seal maintains flexible contact with the sidewall of the slide-out room. The two bulb portions contact one of two flange portions at either end of the slide-out room at both its open and closed positions to create a seal. This arrangement, however, may not be suitable for easy adaptation to be installed on different slide-out room configurations due to its unitary construction. Another problem is that, after long usage, the seal may disengage from the clip and fall off. If the seal falls off the clip, it can be difficult to access the clip for reinstalling the seal without taking the slide out room completely out of the wall.

Therefore, it would be desirable to have a multi-piece room seal that can be easily adapted for installation on different room configurations. It would also be desirable for the seal to be easily assembled on the exterior of the sidewall during installation to provide a single seal portion providing both a wiper seal for wiping against the sidewall of the slide-out room and a bulb seal for contacting the flange around the outside edge of the slide-out room when it is closed.

One prior art reference directed to the concepts associated with seals for slide-out rooms is Ksiezopolki, et al., U.S. Pat. No. 6,966,590 issued Nov. 22, 2005. For purposes of background art, the reference is duplicated in substantial part in the following paragraphs and in FIGS. 1-4. Referring now to prior art drawings in FIGS. 1-4, a mobile living quarters 10, such as a recreational vehicle, is shown having a slide-out room 12. Mobile living quarters 10 include a sidewall 14 having an opening 16 through which the slide-out room 12 shifts. Slide-out room 12 is of well known form including an interior space generally defined by four sidewalls 18 and an end wall 20. Slide-out room 12 fits through opening 16 and extends perpendicular to sidewall 14 such that its end wall 20 is adjacent the sidewall of the mobile living quarters when the slide-out room is retracted and spaced from the sidewall when the slide-out room is extended. A flange 22 extends outwardly from the peripheral edge of end wall 20 of the slide-out room to overlap with sidewall 14 of the mobile living quarters when slide-out room 12 is retracted.

A resilient seal 24 is located along the periphery of opening 16 to prevent dirt, water, and other materials from passing from the exterior of the mobile living quarters 10 to its interior. Seal 24 may be made of any sufficiently resilient material such as thermoplastic elastomer. Seal 24 includes a generally flat mounting portion, or clip portion, 26 with a lip 27 fitted about the edge of sidewall 14 and a wiper seal portion 28 protruding transversely from the mounting portion toward sidewall 18 of the slide-out room. Wiper seal portion 28 is a flexible, generally planar section with its distal end opposite mounting portion 26 in resilient contact with sidewall 18 such that the wiper seal is flexed against the sidewall to maintain an effective seal with the sidewall at all times during extension or retraction of the slide-out room. Seal 24 further includes a bulb seal portion 30 having a bulb part 33 and a clip part 35 which is slidably connected to mounting portion 26.

Mounting portion 26 includes oppositely extending, rail-like tabs 36, 38 which form a tongue 44 separated from the body of the mounting portion by a groove 46. Clip part 35 of bulb seal portion 30 includes tabs 32, 34 which form a groove 42 defined in part by opposing flanges 40. When mounting portion 26 and clip part 35 are connected together, tongues 44 fits into grooves 42. Tabs 32, 34, 36, 38 all extend lengthwise along seal 24 such that, once fitted together, bulb seal portion 30 may be slid along the length of mounting portion 26, and are flexible enough to allow them to snap past each other for assembly. Alternatively, clip part 35 of bulb seal portion 30 may be slid into mounting portion 26 from an end of the seal 24. Preferably, seal 24 is constructed such that mounting portion 26 is more rigid than wiper portion 28, and such that web 31 and tabs 32, 34 are more rigid than bulb part 33.

To install seal 24 onto the mobile living quarters about opening 16, pressure tape 52 having adhesive on both sides is applied to the exterior side of sidewall 14 along the edge of the opening where mounting portion 26 is to be attached. Mounting portion 26 is then located along the exterior edge of opening 16 in the sidewall 14 of the mobile living quarters by abutting lip 27 against the edge of the opening with tabs 36, 38 extending outwardly from the exterior side of sidewall 14 and wiper seal portion 28 extending toward sidewall 18 of the slide-out room. Next, pressure is applied to mounting portion 26 to press the mounting portion against pressure tape 52 to adhere the mounting portion to the sidewall. Fasteners 50 are then inserted through mounting portion 26 into sidewall 14 to firmly secure the mounting portion to the sidewall. Fasteners 50 are preferably screws driven through mounting portion 26 in the space between tabs 36, 38 so as to be hidden behind bulb seal portion 30 when in its mounted position. Next, clip part 35 of bulb seal portion 30 is mounted to mounting portion 26 by either snap fitting grooves 42 about tongues 44 or sliding the bulb seal portion at its groove about the tongue of the mounting portion from one end of the mounting portion. Bulb seal portion 30 is then adjusted in location along mounting portion 26 by sliding the bulb seal portion along the mated tongue 44 and groove 42 connection to its desired final location relative to mounting portion 26. Bulb seal portion 30 may be secured in its final position along mounting portion 26 by placing a fastener 48, preferably a screw, at an angle through only the internal web 31 of the bulb seal portion and the mounting portion near the end of the seal section. Fastener 48 preferably does not penetrate the bulb part 33 of bulb seal 30 in order to maintain a better seal with room flange 22. Bulb seal portion 30 may be subsequently replaced by removing fasteners 48 and installing a new section of bulb seal portion without having to replace the wiper portion.

Seal 24 may be easily adapted to fit to different slide-out room configurations by cutting to any necessary length. A variety of different corner configurations in the opening 16 may be easily adapted to by cutting the bulb seal portion 30 to a different length than the mounting portion 26, and the wiper seal portion 28 may be cut to a third length if necessary. A variety of different gaps between the mobile living quarter's sidewall 14 and the slide-out room sidewalls 18 may be easily adapted to by adjusting the lateral position of the mounting portion 26 relative to the sidewall 14 or trimming back the wiper seal portion 28. By mounting the mounting portion 26 and the bulb seal portion 30 to the exterior side of sidewall 14, subsequent repair and replacement of worn seal parts may be easily performed without having to remove the slide out room 12 from the opening 16 in wall 14.

SUMMARY OF THE INVENTION

The invention disclosed herein includes a resilient seal for use with a slide-out room in a mobile living quarters. More specifically, the invention comprises a three-piece design which allows the user to snap the product into place, without any type of sliding movement being required or allowed. The invention is used with a jacket. A snap-in sealing component is provided, where the sealing component is a separate element from the jacket. The snap-in sealing component includes a right angled bracket. Attached to the right angled bracket on one leg thereof is an elongated wiper comprising an extended base and a bead at the end of the tip. Attached to the other leg of the right angled component is a bulb. The right angled component of the snap-in seal is adapted to releasably attach to the jacket. The attaching feature utilizes a locator/retention lip on one side of the jacket, and a compression lip positioned on the same side of the jacket below the retention lip. With the jacket separate from the snap-in sealing component, an actual mitered corner can be achieved by cutting the jacket at a 45° angle. With a mitered corner, a performance advantage is achieved by preventing leak paths due to the overlap, and also provides for a cosmetic advantage. The jacket allows the end consumer to trim the snap-in seal to match the mitered corner or use a molded insert.

Still further, by having an insert tab and retention tab, the end consumer may repair a damaged snap-in component with relative simplicity, by pressing the tab back and removing. This feature allows repair without removal of an entire slide-out box. More specifically, and advantageously, this feature allows the end consumer to make a repair and get the seal elements back to their same levels as they arrived from the OEM. Prior art designs either require a complete removal of the entire jacket, or need to be knifed trimmed and overlaid. Further, prior designs have the wipes pre-molded onto the jacket. In accordance with a feature of this invention, this design flaw is avoided.

A significant advantage is provided in the sense that the invention allows an OEM to essentially select the design. That is, the seal arrangement is buildable. Design selection can include whether one or two bulbs are desired, and whether one or two wipers are desired. If the jacket would include one wipe, another with one bulb, and a final with one wipe and one bulb, all combinations could be achieved. That is, sealing configurations in accordance with the invention will allow the OEM to choose their own design and still use the same jacket. The OEM can build different units on the same line and use the same jacket, and add or remove different snap-in seals to accommodate the unit. The height of the wipe can also be changed, as well as the size of the bulb. Such buildability provides a significant manufacturer advantage for line speed and tooling costs.

More specifically, and in accordance with the invention, a buildable seal assembly is adapted for use in combination with a mobile living quarters. The mobile living quarters can include a slide out room having a room interior formed in the mobile living quarters and moveable between a retracted, closed position and an extended, open position. Positioning of the slide out room in the open position provides for an increase in living space within an overall interior of the mobile living quarters.

At least one first sidewall is formed as an exterior wall of the mobile living quarters. The sidewall is positionable as either an actual side of the mobile living quarters, or an end of the living quarters. The first sidewall has a room opening formed therein. The opening provides an opening through which the slide out room may extend and retract between the closed and opened positions. The first sidewall also includes an exterior surface facing outwardly from an interior of the mobile living quarters, and an interior surface facing inwardly into the overall interior of the mobile living quarters. An end section is formed between the interior surface and the exterior surface. The end section forms an end of the first sidewall facing towards the slide out room.

The slide out room comprises at least a second sidewall positioned adjacent to and slideably moveable relative to the first sidewall. An end wall which, together with two or more of the second sidewalls, defines the room interior of the slide out room is also part of the slide out room. The end wall includes a peripheral flange overlapping the first sidewall when the slide out room is in the closed position.

In accordance with certain concepts of the invention, the seal assembly includes a seal component and a jacket. The seal component includes a right-angled seal element having a side leg and an angled leg. Each of the legs is configured at a substantially 90 degree angle relative to the other leg. A wiper assembly flexible in nature and secured to the right angled seal element is also provided. The wiper assembly maintains an effective seal between the first sidewall and the second sidewall during extension and retraction of the slide out room.

A bulb assembly is secured to the right angled seal element. The bulb assembly provides for a continuous seal between the exterior surface of the first sidewall and a surface of the peripheral flange of the end wall when the slide out room is in a closed, retracted position. The jacket is securable on the first sidewall and releasably securable to the right angled seal element for purposes of positioning the bulb assembly and the wiper assembly for maintaining appropriate sealing when the slide out room is in the closed position, and when the slide out room is moving between the closed and open positions.

In accordance with other concepts of the invention, the bulb assembly and the right angled seal element have snap fit components for securing the bulb assembly to the right angled seal through a releasable snap fit connection, without permitting or otherwise allowing any connection of the bulb assembly to the right angled seal element through a sliding movement of the bulb assembly. The right angled seal element can be an element separate from the jacket.

The jacket can include a bight section positioned adjacent the end section of the first sidewall, with first and second opposing ends. A first leg extends at an angle from the first end of the bight section. A second end extends at an angle from the second end of the bight section. The first leg and second leg are positioned adjacent the exterior and the interior surfaces of the first sidewall.

The first and second legs of the jacket are angled inwardly, relative to the bight section, at an angle greater than 90 degrees. This applies a compressive force when positioned on the sidewall.

The bight section of the jacket includes a pair of insert tabs, with the insert tabs forming a first insert tab and a second insert tab, positioned in an opposing relationship. The insert tabs are utilized to capture nubs on the buildable seal assemblies. Each of the insert tabs includes an inwardly extending hook for purposes of capturing the nubs. The structure and configuration of the seal assembly allows a user to snap fit the seal assembly in place around at least three sides of the room opening, without requiring any type of sliding movement for positioning components of the seal assembly.

In accordance with other aspects of the invention, an elongated wiper assembly is releasably attached to one of the legs of the right angled bracket. The wiper assembly includes an extended base, with a resilient tip formed at the end thereof. The wiper assembly includes a bead formed at the end of the tip.

The seal assembly includes a bulb releasably attached to the first leg of the sealing component. The sealing component is releasably attached to the jacket through a locator/retention lip positioned on a first leg of the jacket, and a compression lip positioned on the first leg of the jacket below the retention lip. With the jacket separate from the sealing component, a mitered corner can be positioned by cutting the jacket at a 45 degree angle. The mitered corner provides for a performance advantage by substantially preventing leak paths from forming, in view of the overlap resulting from the mitered corners and further provides for an aesthetic appearance.

When a user wishes to repair the seal assembly, the seal component can be replaced and removed from the jacket by applying force on the retention tabs, so as to permit removal of the seal component tabs from being captured under the retention tabs outside jacket.

In accordance with other concepts of the invention, the seal assembly can include two or more bulbs. Further, the seal assembly can also include two or more wiper assemblies.

The jacket can include a pair of sealing lips, with each of the lips being positioned at a terminating end of the first or second leg of the jacket. The jacket is structured so as to provide and apply a compressive force to the lips. The jacket is positively actuated with respect to the sealing lips, with the first and second legs of the jacket being angled inwardly at an angle greater than 90 degrees. A retention tab is located on the first leg of the jacket, with the retention tab acting so as to provide for retention of one leg of the seal component. The seal component can be releasably coupled to the jacket at least in part through a snap in configuration. A nub is formed at a distal end of the side leg. When the seal component is coupled to the jacket, the nub is positioned so as to essentially be captured under a lip of a first insert tab of the jacket.

Further, the bight section of the jacket includes at least a first insert tab. The insert tab is utilized to capture a nub of the seal component. The insert tab comprises an inwardly extending hook for capturing the nub of the seal component. A user can replace the bulb or the wiper assembly without requiring any removal or repair of any components of the jacket.

Still further, for some applications, just the snap-in seal itself can be utilized, and simply taped under the wall. This would allow significant flexibility and versatility. Further, by having the jacket overlayed by the snap-in seal, the jacket could be made relatively thinner, thereby making it easier to trim for the OEM.

BRIEF DESCRIPTION OF THE DRAWINGS

These and other aspects of the invention will be apparent from the following description, with reference to the accompanying drawings, in which.

DETAILED DESCRIPTION

Figure 1:
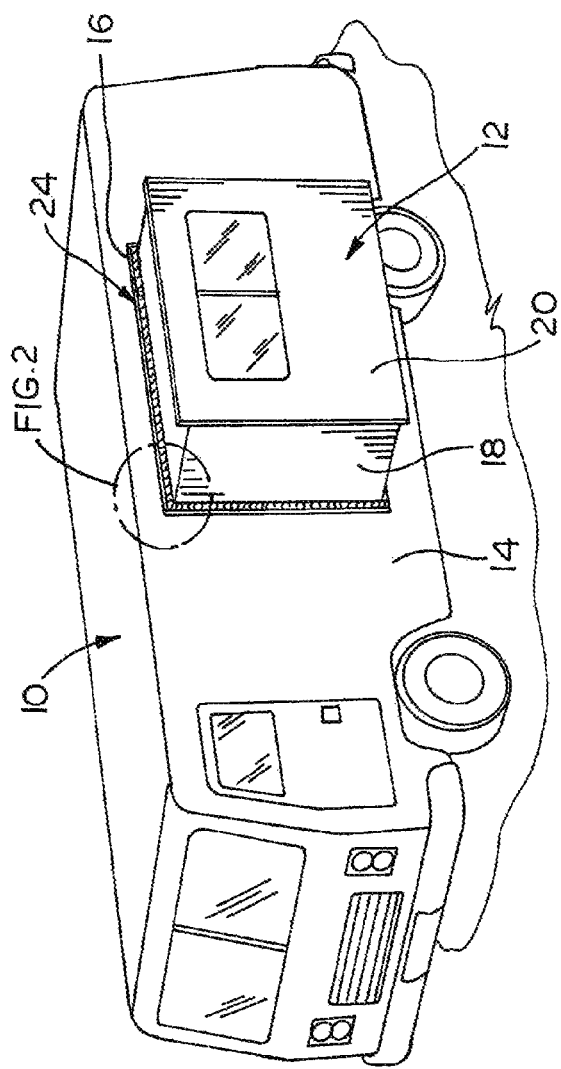
FIG. 1 shows a prior art mobile living quarters with a slide-out room in an extended position surrounded by the seal.
Figure 2:
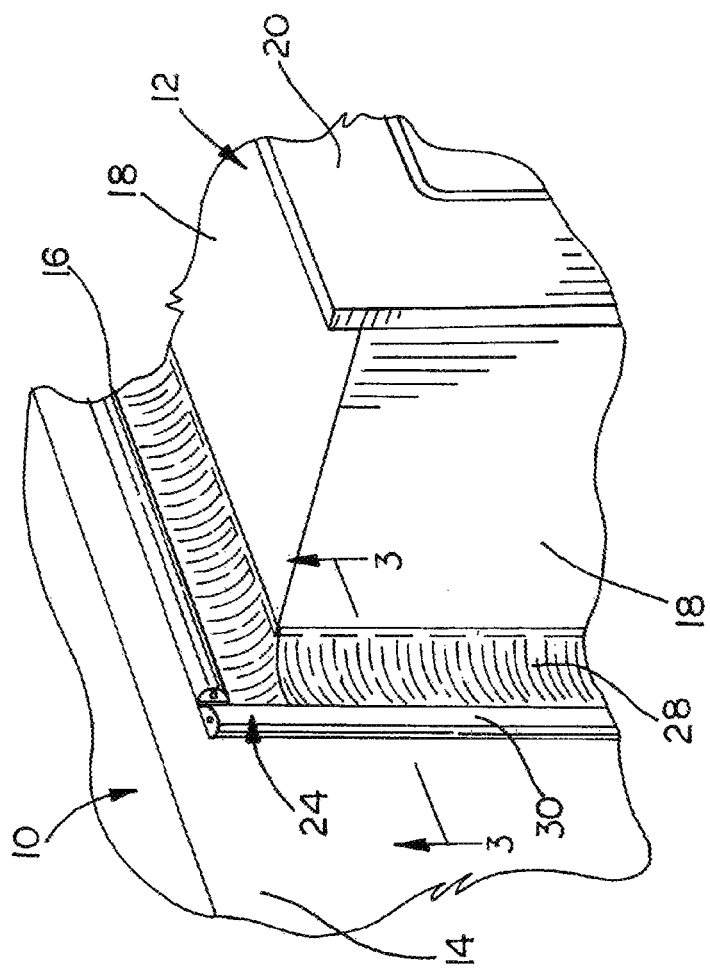
FIG. 2 is a fragmentary detail perspective view of the room and seal of FIG. 1.
Figure 3:
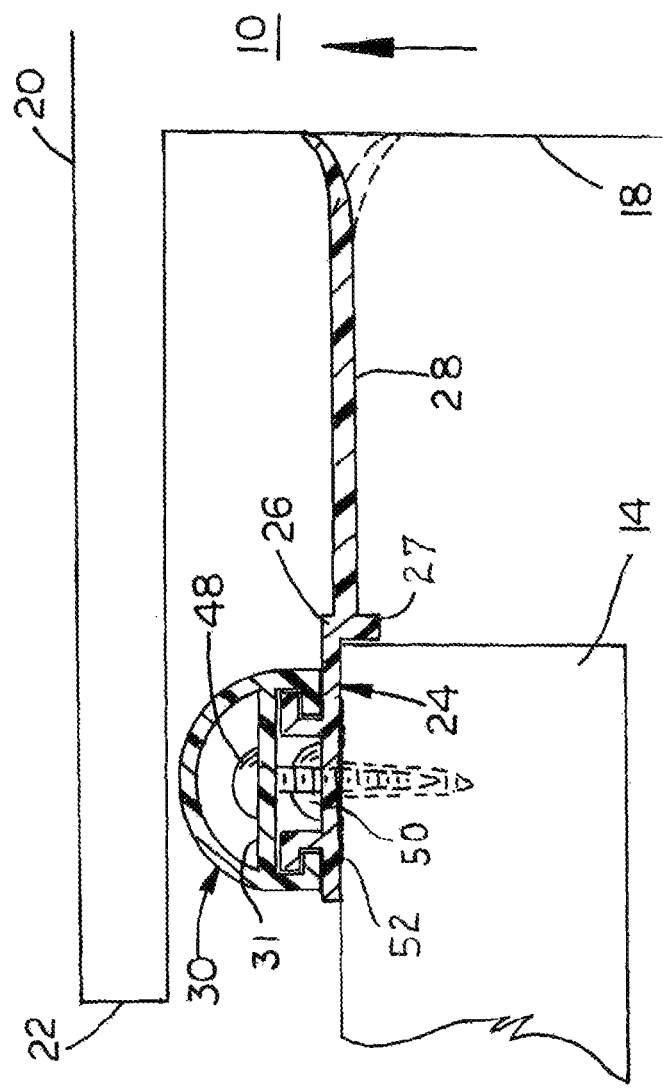
FIG. 3 is a fragmentary cross sectional view as seen along line 3-3 in FIG. 2.
Figure 4:
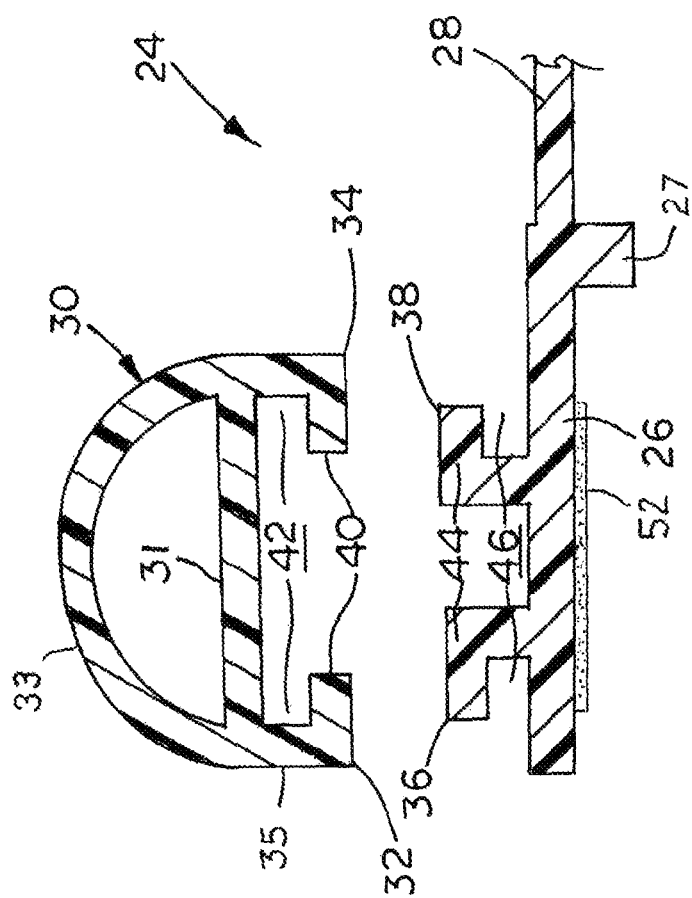
FIG. 4 is a detailed cross section of the resilient seal parts separated from each other.
Figure 5:
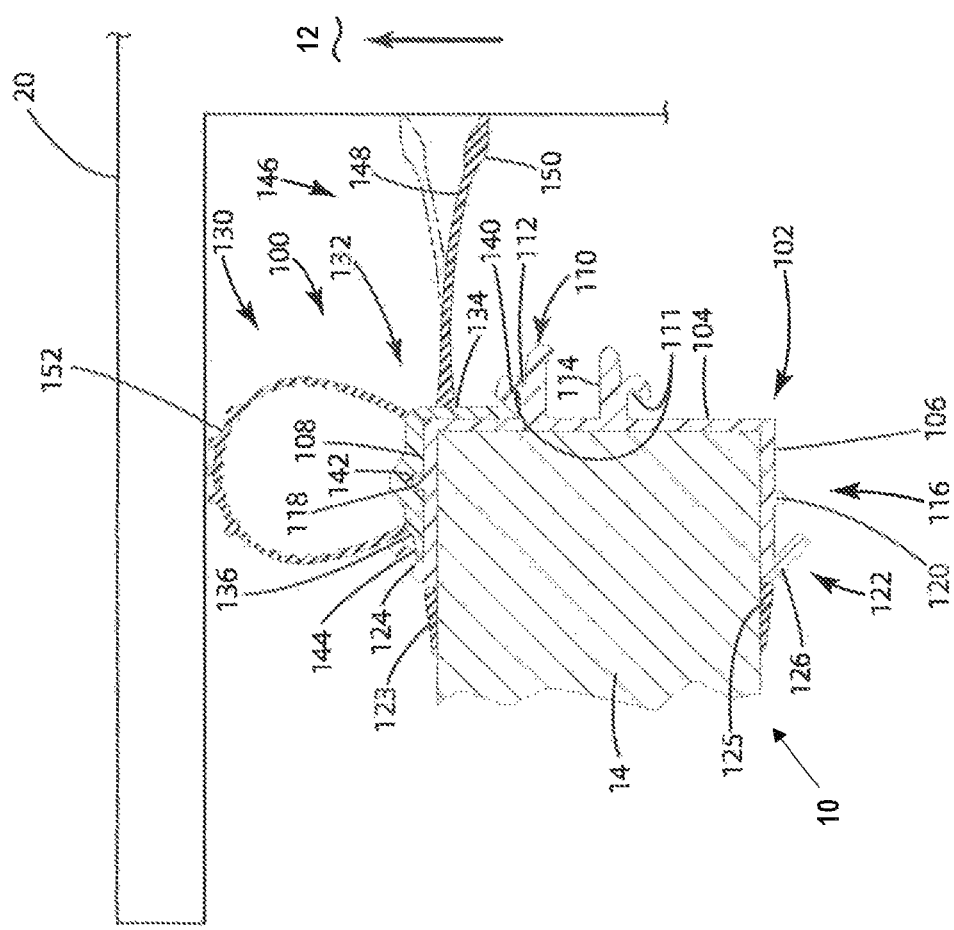
FIG. 5 is a sectional view of the buildable seal assembly for slide-out rooms in accordance with the invention.
Figure 6:
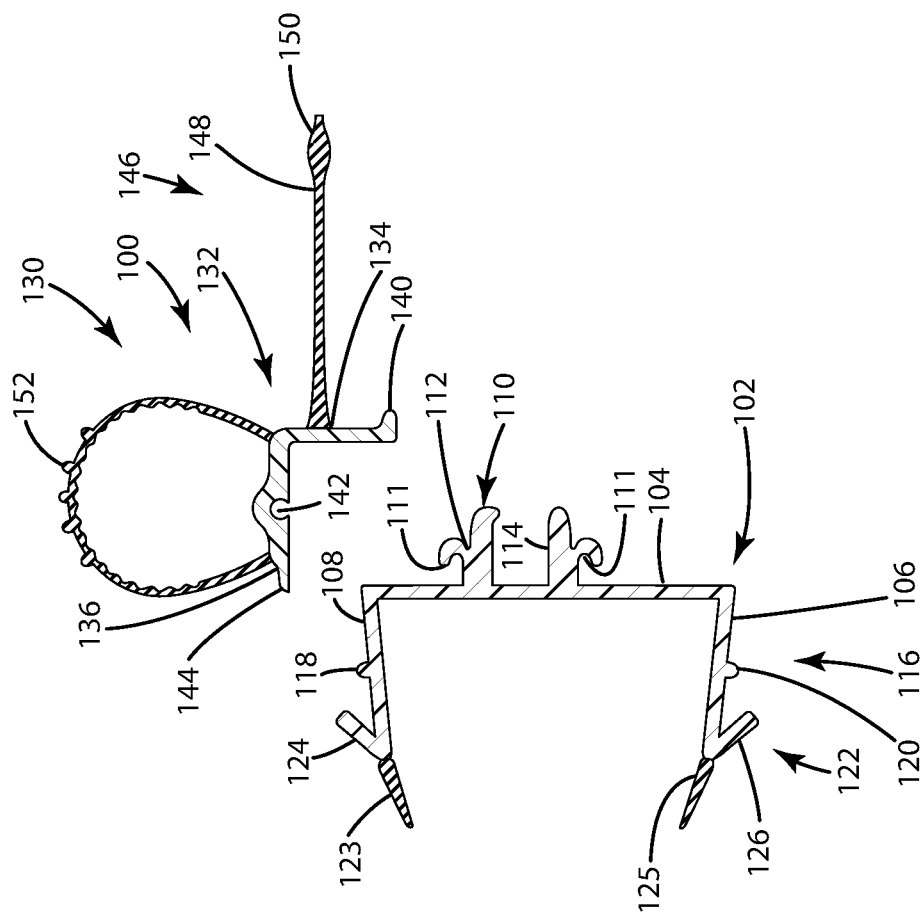
FIG. 6 is an exploded view of the buildable seal assembly for slide out rooms in accordance with the invention, the exploded view being that of the buildable seal assembly shown in FIG. 5.
Figure 7:
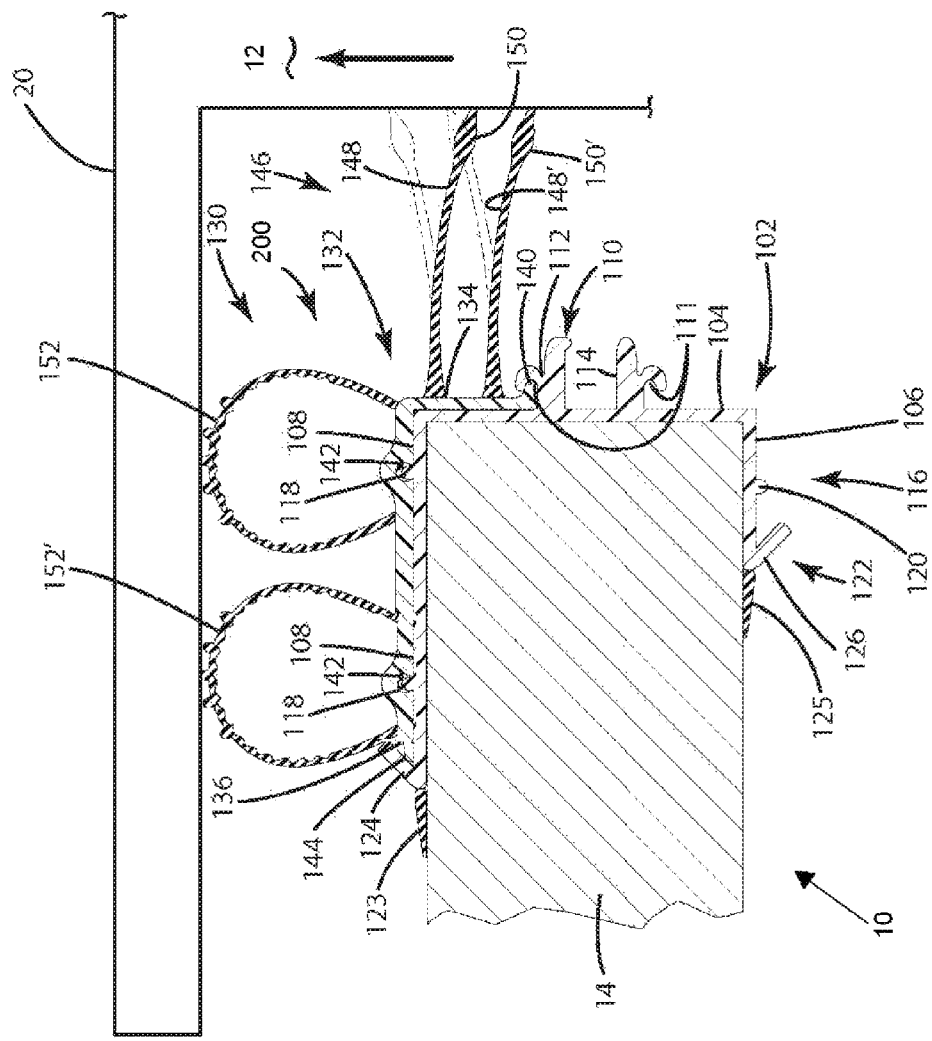
FIG. 7 is a sectional view, similar to FIG. 5, showing a second embodiment of a buildable seal assembly in accordance with the invention, with the embodiment having a pair of bulb assemblies and a pair of wiper assemblies.
Figure 8:
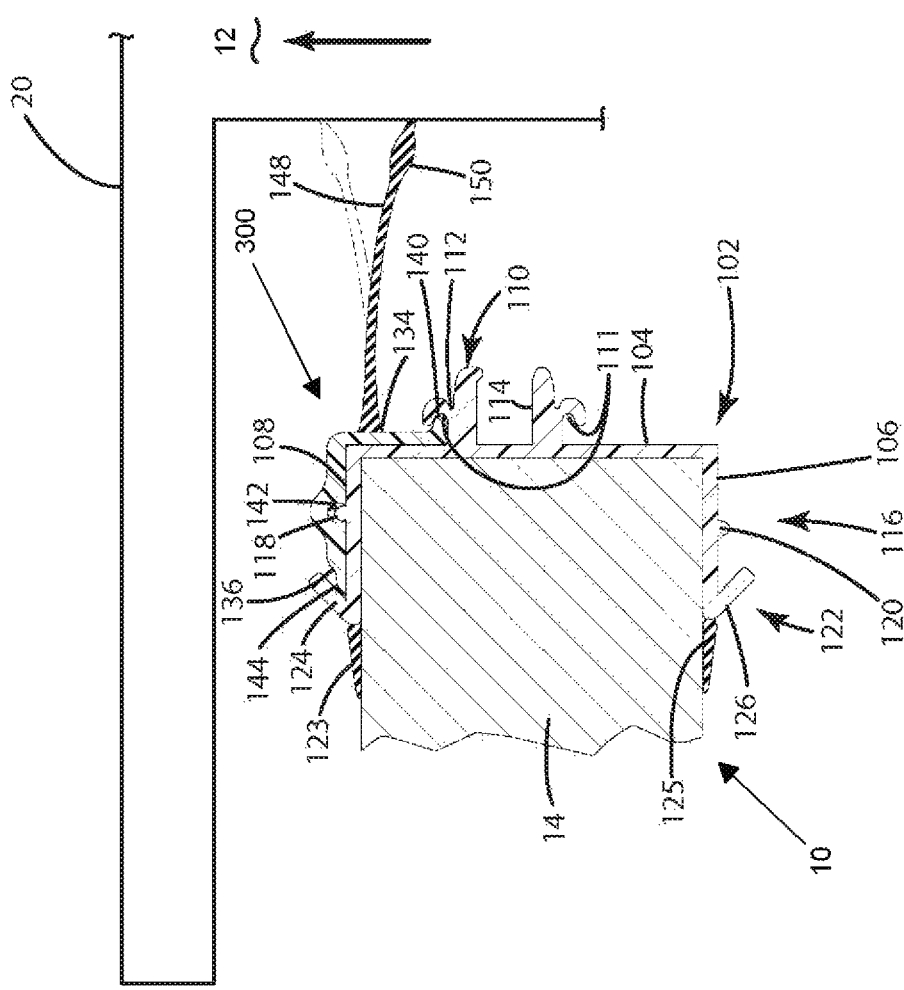
FIG. 8 is a sectional view, similar to FIG. 5, of a third embodiment of a buildable seal assembly in accordance with the invention, with the embodiment showing the use of one wiper assembly, and the absence of any bulb assembly.

The principles of the invention are disclosed, by way of example, in a buildable seal assembly 100 as illustrated in FIG. 5. In addition to the view of the buildable seal assembly 100 in FIG. 5, FIG. 6 is an exploded view of the buildable seal assembly 100. Further, FIG. 7 is a sectional view, similar to FIG. 5, of a second embodiment of a buildable seal assembly 200 in accordance with the invention. Similarly, FIG. 8 illustrates a third embodiment of a buildable seal assembly 300, in accordance with the invention, with FIG. 8 being a sectional view similar to FIG. 5. The buildable seal assembly 100 is used in association with a jacket 102 as also shown in FIG. 5. The buildable seal assembly 100 in accordance with the invention can be characterized as a three-piece design which allows the user to snap the seal assembly into place, without the requirement of any type of sliding movement. The buildable seal assembly 100 is illustrated in FIG. 5 as showing the use of one bulb 152 and one wiper 146. However, in accordance with the invention, seal assembly 100 is buildable in that multiple wiper components 146 and/or multiple bulbs 152 can be utilized. An advantage in accordance with the invention is that the OEM can choose the particular design, in terms of the number of bulbs and wiper components, yet still retain use of the same jacket 102. Still further, not only can the number of bulbs and wiper components be modified, but various lengths of wipers and sizes of bulbs can also be utilized.

Turning specifically to FIGS. 5 and 6, the jacket 102 is shown connected to the sidewall 14 and slide-out room 12 of a conventional RV or similar mobile equipment 10. The jacket 102 includes a bight section 104. The bight section 104 includes, extending from one surface therefrom, a pair of insert tabs 110. The insert tabs 110 include a first insert tab 112, and a second insert tab 114. The insert tabs are positioned in an opposing relationship and are utilized to capture nubs 140 of the buildable seal assembly 100. The insert tabs 110 can each have an inwardly extending hook 111 for purposes of capturing the nubs 140.

In addition to the foregoing elements, the bight section 102 also includes a first leg 106 which extends at an angle from one end of the bight section 104 of the jacket 102. Correspondingly, a second leg 108 extends at an angle from the opposing end of the first side 104 of the jacket 102. It should be noted that the legs 106 and 108 of the jacket 102 will not necessarily be at right angles relative to the side 104 of the jacket 102, but instead may actually be angled inwardly greater than 90°, so as to apply a compressive force to the sealing lips 123 and 125. That is, this angling feature essentially provides for the jacket 102 to be positively actuated with respect to the lips 123 and 125.

Positioned on the first leg 106 and second leg 108 are a pair of locator/retention lips 116. The locator/retention lips 116 include a first locator/retention lip 120 positioned on the outer side of the first leg 106, and a second locator/retention lip 118 positioned on the outer side of the second leg 108. The retention lips 116 are utilized in cooperation with the buildable seal assembly 100 to capture the seal assembly 100 in a "snap-in" relationship.

In addition to the locator/retention lips, the jacket 102 also includes a pair of retention tabs 122. The retention tabs 122 act so as to provide for retaining of one leg of the seal assembly 100. It is apparent that if two seal assemblies are utilized, then both retention tabs 122 would be used simultaneously. The retention tabs 122 comprise a first retention tab 124 located on the second leg 108 of the jacket 102, and a second retention tab 126 located on the first leg 106 of the jacket 102. Positioned inwardly from the ends of the first and second legs 106, 108 of the jacket 102 are a pair of compression lips 123 and 125. Compression lip 125 extends inwardly from the end of the first leg 106 of jacket 102, while the other compression lip 123 extends inwardly from the end of the second leg 108 of the jacket 102. The compression lips 123, 125 serve to maintain position and seal of the jacket 102.

The buildable seal assembly 100 further includes a snap-in seal assembly 130, as also shown in FIGS. 5 and 6. It should be emphasized that the snap-in seal assembly 130 is only one embodiment of seal assemblies in accordance with the invention. For example, multiple seal assemblies 130 may be utilized with the jacket 102. With reference to FIGS. 5 and 6, the seal assembly 130 includes a right-angled seal element 132. The right-angled seal element 132 comprises the basic seal element which will be coupled to the jacket 102 in a snap-in configuration. The right-angled seal element 132 includes a pair of legs, identified in FIG. 5 as side leg 134 and angled leg 136. Each of the legs 134, 136 is configured at a 90 degree angle relative to the other leg. At the distal end of the side leg 134 is a nub 140. The nub 140, when the assembly 130 is coupled to the jacket 102, will be positioned so as to essentially be captured under the lip 111 of the first insert tab 112. Alternatively, the seal assembly 130 can be configured so that the nub 140 would be captured under the lip 111 of the second insert tab 114.

Positioned on one side of the angled leg 136, and essentially centered with respect thereto, is a slot 142. The slot 142, with the right-angled seal element 132 being resilient, is configured so as to capture the locating/retention lip 118 in a snap-in configuration.

Further with respect to the right-angled seal element 132, positioned at a distal end of the angled leg 136 is a tab 144. When assembled, the tab 144 is captured within the first retention tab 124, or the second retention tab 126. This configuration serves to stabilize the snap-in seal assembly 130 when coupled to the jacket 102.

The buildable seal assembly 100 can also include a wiper component 146 as further shown in FIG. 5. The wiper component 146 is flexible in nature, and facilitates the maintaining of an effective seal with the sidewall 10 at all times during extension or retraction of an associated slide-out room (not shown). The wiper component 146 includes an elongated wiper 148. Positioned at the distal end of the elongated wiper 148 is a bead 150. With respect to connection of the wiper component 146 to the right-angled seal component 132, the wiper component 146 can be molded onto the right-angled seal element 132 in line, while the same is being extruded.

In addition to the foregoing components, the snap-in seal assembly 130 can include a bulb 152 having a configuration as shown in cross-section in FIGS. 5 and 6. It should be noted that the right-angled seal element 132 can be used with or without the wiper component 146, and also with or without the bulb 152. Still further, it can also be noted that the length of the wiper components 146 and the bulb sizes can be changed, in accordance with the invention.

FIG. 7 is a second embodiment of a buildable seal assembly 200 in accordance with the invention. Specifically, the structure of the buildable seal assembly 200 is substantially similar to that of buildable seal assembly 100 illustrated in FIGS. 5 and 6. However, the buildable seal assembly 200 in FIG. 7 includes a second bulb 152' connected to the right angled seal element 132 adjacent the bulb 152. Further, the seal assembly 200 also includes a second wiper assembly 148' having a bead 150' positioned at the distal end of the elongated wiper.

A third embodiment of a buildable seal assembly 300 is illustrated in a sectional view of FIG. 8. Specifically, the seal assembly 300 is not using a bulb assembly whatsoever, but instead is only using one wiper component 148. It should be emphasized that the buildable seal assemblies in accordance with the invention are not limited to a specific number of bulbs or wiper components, and any number can be used without departing from the principal novel concepts of the invention In summary, the embodiments of the invention are utilized to create relatively water-tight seals around the perimeters of slide-out rooms of RV's and similar vehicles. The slide-out boxes on RV's telescope out of the wall, creating more square footage inside the unit. Since the room is dynamic, there is a requirement to have a seal around a perimeter, so as to stop the intrusion of light, water, and debris. The embodiments in accordance with the invention provide for several advantageous features.

For example, with the jacket 102 separate from the snap-in sealing element 132, an actual mitered corner can be achieved by cutting the jacket at a 45 degree angle. Other embodiments require the top seal to overlap the sides. This feature offers a significant performance advantage, by preventing leak paths due to the overlap, as well as providing a cosmetic or aesthetic advantage. The jacket 102 will allow the end consumer to trim the snap-in seal so as to match the mitered corner, or so as to use a molded insert.

Further, by having the insert tabs 110 and the retention tabs 122, an end consumer may repair a damaged snap-in seal with relative simplicity, by pressing the tab back and removing the same. Other systems require a complete removal of the jacket.

Of primary importance, the embodiments in accordance with the invention are buildable and the OEM can choose the design. In the particular embodiments shown in FIGS. 5-8, the OEM can utilize one or two bulbs 152, and one or two wiper components 146. Further, the OEM can build different units on the same line, and use the same jacket and add or remove different snap-in seals, so as to accommodate the unit. Further, modifications can be made in the height of the wiper component or the size of the bulbs 152, and in the different combinations of the same. This provides a significant manufacturing advantage for line speed and tooling costs.

As earlier stated, some applications may just require the seal component 132. In such an event, the jacket 102 can be made thinner and trimming is facilitated.

It will be apparent to those skilled in the pertinent arts that other embodiments of the invention can be designed. That is, the principles of the invention are not limited to the specific embodiments described herein. Accordingly, it will be apparent to those skilled in the art that modifications and other variations of the above-described illustrative embodiments of the invention may be effected without departing from the spirit and scope of the novel concept of the invention.

The invention claimed is:

1. A buildable seal assembly adapted for use in combination with a mobile living quarters, said mobile living quarters comprises:
   a slide-out room having a room interior formed in said mobile living quarters and movable between a retracted, closed position and an extended, open position, whereby positioning of said slide-out room in said open position provides for an increase in living space within an overall interior of said mobile living quarters;
   at least one first side wall formed as an exterior wall of said mobile living quarters, said side wall being positionable as either an actual side of said mobile living quarters, or an end of said mobile living quarters;
   said first side wall having a room opening formed therein, said room opening providing an opening through which said slide-out room may extend and retract between said closed and said open positions, respectively;
   said first side wall further comprises an exterior surface facing outwardly from an interior of said mobile living quarters, an interior surface facing inwardly into said overall interior of said mobile living quarters, and an end section formed between said interior surface and said exterior surface, said end section forming an end of said first side wall facing toward said slide-out room;
   said slide-out room comprises at least a second side wall positioned adjacent to and slidably movable relative to said first side wall, and an end wall which, together with two or more of said second side walls, defines said room interior of said slide-out room;
   said end wall comprises a peripheral flange overlapping said first side wall when said slide-out room is in said closed position;
   characterized in that said seal assembly comprises a seal component and a jacket, said seal component comprises:
      a right-angled seal element comprising a side leg and an angled leg, each of said legs being configured at substantially a 90° angle relative to the other leg;
      a wiper assembly flexible in nature and secured to the right angled seal element, for maintaining of an effective seal between said first side wall and said second side wall during extension and retraction of said slide-out room;
      a bulb assembly secured to said right-angled seal element, said bulb assembly providing for a continuous seal between said exterior surface of said first side wall and a surface of said peripheral flange of said end wall when said slide out room is in a closed, retracted position; and
   said jacket is securable on said first side wall and releasably securable to said right angled seal element for purposes of positioning said bulb assembly and said wiper assembly for maintaining appropriate sealing when said slide-out room is in said closed position, and when said slide-out room is moving between said closed and said open positions.

2. A buildable seal assembly in accordance with claim 1, characterized in that said bulb assembly and said right angled seal element comprise snap fit components for securing said bulb assembly to said right angled seal element through a releasable snap fit connection, and without permitting or otherwise allowing any connection of said bulb assembly to said right angled seal element through a sliding movement of said bulb assembly.

3. A buildable seal assembly in accordance with claim 2, characterized in that said right angled seal element is an element separate from said jacket.

4. A buildable seal assembly adapted for use in combination with a mobile living quarters, said mobile living quarters comprises:
a slide-out room having a room interior formed in said mobile living quarters and movable between a retracted, closed position and an extended, open position, whereby positioning of said slide-out room in said open position provides for an increase in living space within an overall interior of said mobile living quarters;
at least one first side wall formed as an exterior wall of said mobile living quarters, said side wall being positionable as either an actual side of said mobile living quarters, or an end of said mobile living quarters;
said first side wall having a room opening formed therein, said room opening providing an opening through which said slide-out room may extend and retract between said closed and said open positions, respectively;
said first side wall further comprises an exterior surface facing outwardly from an interior of said mobile living quarters, an interior surface facing inwardly into said interior of said mobile living quarters, and a section end formed between said interior surface and said exterior surface, said section end forming an end of said first side wall facing toward said slide-out room;
said slide-out room comprises at least a second side wall positioned adjacent to and slidably movable relative to said first side wall, and an end wall which, together with two or more of said second side walls, defines said room interior of said slide-out room;
said end wall comprises a peripheral flange overlapping said first side wall when said slide-out room is in said closed position;
characterized in that said seal assembly comprises a jacket adapted to be releasably secured to said first side wall, said jacket comprises:
a bight section adapted to be positioned adjacent said end section of said first side wall, and having first and second opposing ends;
a first leg which extends at an angle from said first end of said bight section; a second leg extending at an angle from said second end of said bight section, said first leg and said second leg being positioned adjacent said exterior and said interior surfaces of said first side wall;
said first and second legs of said jacket are angled inwardly, relative to said bight section, at an angle greater than 90°, so as to apply a compressive force when positioned on said first side wall;
said bight section of said jacket comprises a pair of insert tabs, said insert tabs forming a first insert tab and a second insert tab, positioned in an opposing relationship; and said seal assembly is capable of being used with a single wiper and a single bulb.

5. A buildable seal assembly in accordance with claim 4, characterized in that said insert tabs are utilized to capture nubs on said buildable seal assemblies.

6. A buildable seal assembly in accordance with claim 5, characterized in that each of said insert tabs comprises an inwardly extending hook for purposes of capturing said nubs.

7. A buildable seal assembly in accordance with claim 1, characterized in that the structure and configuration of said buildable seal assembly allows a user to snap-fit said buildable seal assembly in place around at least three sides of said room opening, without requiring any type of sliding movement for positioning components of said buildable seal assembly in place.

8. A buildable seal assembly in accordance with claim 7, characterized in that an elongated wiper assembly is releasably attached to one of said legs of said right angled bracket.

9. A buildable seal assembly in accordance with claim 8, characterized in that said elongated wiper assembly comprises an extended base, having a resilient tip formed at the end thereof.

10. A buildable seal assembly in accordance with claim 9, characterized in that said elongated wiper assembly comprises a bead formed at an end of said tip.

11. A buildable seal assembly in accordance with claim 9, characterized in that said seal assembly comprises a bulb releasably attached to said first leg of said sealing component.

12. A buildable seal assembly in accordance with claim 11, characterized in that said sealing component is releasably attached to said jacket through a locator/retention lip positioned on a first leg of said jacket, and a compression lip positioned on said first leg of said jacket below said retention lip.

13. A buildable seal assembly in accordance with claim 12, characterized in that with said jacket separate from said snap-in sealing component, a mitered corner can be achieved by cutting said jacket at an angle of 45 degrees.

14. A buildable seal assembly in accordance with claim 13, characterized in that said mitered corners provide for a performance advantage by substantially preventing leak paths forming, in view of overlap resulting from said mitered corners, and further provides for an aesthetic appearance.

15. A buildable seal assembly in accordance with claim 14, characterized in that when a user wishes to repair said buildable seal assembly, said seal component can be replaced and removed from said jacket by applying forces on said retention tabs so as to permit removal of seal component tabs from being captured under said retention tabs' outside jacket.

16. A buildable seal assembly in accordance with claim 1, characterized in that said seal assembly comprises two or more of said bulbs.

17. A buildable seal assembly in accordance with claim 1, characterized in that said seal assembly comprises two or more wiper assemblies.

* * * * *